United States Patent Office 3,190,824
Patented June 22, 1965

3,190,824
PROCESS FOR PREPARING BENZOPHENONES
David Taub, Metuchen, Norman L. Wendler, Summit, and Chan-Hwa Kuo, Metuchen, N.J., assignors to Merck & Co., Inc., Rahway, N.J., a corporation of New Jersey
No Drawing. Filed Oct. 19, 1961, Ser. No. 145,033
4 Claims. (Cl. 204—158)

This application is a continuation-in-part of our application Serial No. 70,911, filed November 22, 1960, now abandoned.

This invention relates generally to the preparation of chemical compounds. More particularly, it relates to a new and novel synthesis of benzophenone compounds. It relates further to novel substances which are intermediates in producing said benzophenone compounds. Still more specifically, it is concerned with derivatives of 2,4'-dihydroxy-4,6,2'-trimethoxybenzophenone, with the synthesis of such compounds, and with intermediates obtained in such synthesis.

Griseofulvin is a well-known antifungal agent having the structural formula

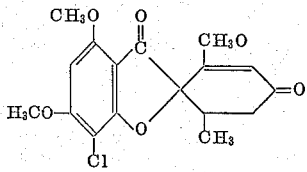

It is an antifungal agent effective when administered orally in the treatment of various systemic fungus infections. Heretofore, griseofulvin has been produced microbiologically by certain strains of Penicillia. Meanwhile, efforts have continued to synthesize the complex griseofulvin molecule chemically since a feasible chemical synthesis would permit the study of improved methods of making griseofulvin and would further permit the preparation of griseofulvin analogs and derivatives that are not accessible by fermentation.

It has now been found that griseofulvin and analogs thereof may be synthesized chemically by a relatively short and feasible process employing as the starting materials an appropriately substituted phenol and an appropriately substituted benzoyl halide. This process may be pictured structurally as follows:

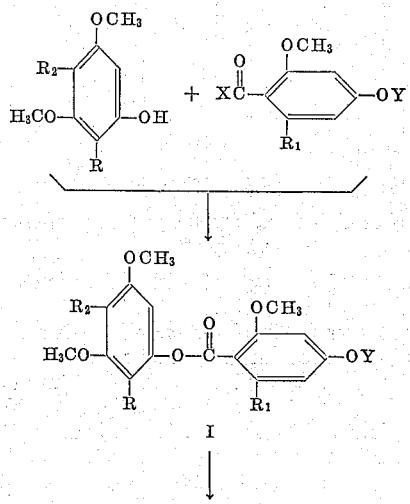

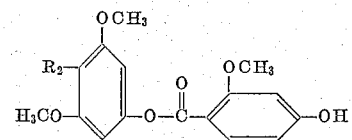

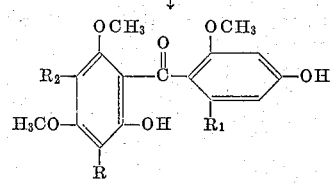

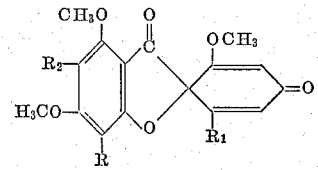

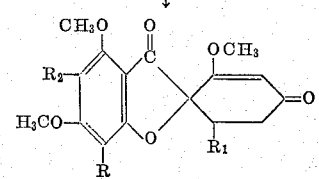

In the above formulas, R and $R_2$ represent hydrogen or halogen and may be the same or different in a specific compound, $R_1$ is hydrogen or a lower alkyl group, X is chlorine or bromine, and Y is a lower alkanoyl radical. 2,4'-dihydroxy-3-R-4,6,2'-trimethoxy-5-$R_2$-6'-$R_1$-benzophenones of Formula III above are important intermediates in this synthesis of griseofulvin and analogs thereof. Thus, when R is chloro, $R_1$ is a methyl radical and $R_2$ is hydrogen the benzophenone III is an intermediate in making griseofulvin itself. It is one object of this invention to provide such benzophenone compounds. Another object is to provide a new and novel synthesis of such substances. A further object is provision of new benzoic acid esters which are key intermediates in making the compounds of Formula III above. Additional objects will be clear from the following explanation of our invention.

In accordance with the present invention, we have discovered that 2,4'-dihydroxy-3-R-4,6,2'-trimethoxy-5-$R_2$-6'-$R_1$-benzophenones, where R and $R_2$ are hydrogen or halogen, and $R_1$ is hydrogen or a lower alkyl group, are produced by reacting together 2-R-4-$R_2$-3,5-dimethoxyphenol and 2-$R_1$-4-loweralkanoyloxy-6-methoxybenzoyl halide to form 2-R-4-$R_2$-3,5-dimethoxyphenyl 2-$R_1$-4-loweralkanoyloxy-6-methoxybenzoate (Compound I), treating this latter compound with base under mild conditions to produce 2-R-4-R₂-3,5-dimethoxyphenyl 2-R₁-4-hydroxy-6-methoxybenzoate (Compound II), and irradiating this material to obtain 2,4′-dihydroxy-3-R-4,6,2′-trimethoxy-5-R₂-6′-R₁-benzophenone (Compound III).

In this process the R, R₁ and R₂ substituents are not chemically affected by the reactions involved so that the nature of R, R₁ and R₂ in the starting materials will determine the substitution of the benzophenone Compound III, and also of the final product V (griseofulvin or a griseofulvin analog). R and R₂ may be hydrogen or a halogen such as a chloro, bromo or fluoro substituent. They may be the same or different in a specific compound. In griseofulvin, R is a chloro substituent and R₂ is hydrogen. R₁ may be hydrogen or a lower alkyl radical such as methyl, ethyl, propyl and the like. We prefer that the lower alkyl radical contain from 1–5 carbon atoms. R₁ is a methyl substituent in griseofulvin. The 4-position of the benzoyl halide (OY in the above flowsheet) employed as one of the starting materials in the process of the invention contains a lower alkanoyloxy radical, such as acetoxy, propionoxy, butyroxy and the like. In the flowchart, X is a halogen, and preferably chlorine or bromine.

According to the first step of our new process, a benzoyl halide containing either hydrogen or a lower alkyl group in the 2-position, a lower alkanoyl radical in the 4-position, and a methoxy substituent in the 6-position is intimately contacted with a 3,5-dimethoxyphenol which has either hydrogen or a halo group ortho and/or para to the phenolic hydroxyl group. We prefer to carry out this reaction in a tertiary amine solvent such as pyridine or an alkyl pyridine although other solvents such as dimethylformamide and the like could be employed. The desired reaction is preferably effected by warming the reaction mixture to about 70–100° C. for a few minutes. The reaction conditions are not unduly critical although it is advisable for best results to avoid holding the reaction mass at elevated temperatures for any considerable period of time. When the reaction is substantially complete, the desired product (Compound I above) is recovered by extraction into a suitable water-immiscible organic solvent, washing the solvent with acid and then with base to remove by-products, and finally crystallization of the benzoic acid ester from a solvent such as ether. The 2-R-4-R₂-3,5-dimethoxyphenyl 2-R₁-4-acyloxy-6-methoxybenzoate thus obtained is then converted to the corresponding 4-hydroxy compound (Formula II above) by treatment with a base under mild conditions. Since there are two ester linkages in the compound, it is necessary to hydrolyze the desired one preferentially. One convenient method is by treatment of the ester having structure I with aqueous methanolic sodium hydroxide at about room temperature for 1–6 hours. It will, of course, be appreciated by those skilled in the art that other alkaline metal hydroxides or other aqueous alkanols may be used if desired. In this way there may be produced from the appropriate starting material 2-chloro-3,5-dimethoxy-phenyl 2-methyl-4-hydroxy-6-methoxybenzoate (Compound II, R=chloro, R₁=methyl, R₂=hydrogen); 2-fluoro-3,5-dimethoxyphenyl 2-methyl-4-hydroxy-6-methoxybenzoate (R=fluoro, R₁=methyl, R₂=hydrogen); 3,5-dimethoxyphenyl 2-ethyl-4-hydroxy-6-methoxybenzoate (R and R₂=hydrogen, R₁=ethyl); 4-fluoro-3,5-dimethoxyphenyl 2-methyl-4-hydroxy-6-methoxybenzoate (R=hydrogen, R₁=methyl, R₂=fluoro); 2,4-difluoro-3,5-dimethoxyphenyl 2-methyl-4-hydroxy-6-methoxybenzoate (R, R₂=fluoro, R₁=methyl); and similar compounds wherein R, R₁ and R₂ have the meanings set forth above.

In the next step of this invention, the benzoate ester II is exposed to ultra-violet light whereby a rearrangement occurs with formation of the benzophenone Compound III. This reaction is conveniently carried out in a solvent medium at temperatures of from about 30° C. to about 60° C. for from about 24 to about 72 hours. Examples of solvents which are suitable in this process are lower alkanols such as methanol, ethanol or isopropanol, acetonitrile, benzene and the like. The solvent medium is not critical although it is desirable to avoid solvents which might themselves react under ultra-violet light, e.g. ethers. We prefer to employ one of the standard commercially available ultra-violet lamps as the source of the ultra-violet light although any means of ultra-violet irradiation, including sun light, is satisfactory. Included among the benzophenone compounds which may be produced by this reaction are 2,4′-dihydroxy-3-chloro-4,6,2′-trimethoxy-6′-methylbenzophenone (Compound III, R=Cl, R₁=CH₃); 2,4′-dihydroxy-3-fluoro-4,6,2′-trimethoxy - 6′-ethylbenzophenone (R=F, R₁=C₂H₅); 2,4′-dihydroxy-4,6,2′-trimethoxy-6′-propylbenzophenone

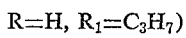

R=H, R₁=C₃H₇)

2,4′-dihydroxy - 3 - fluoro-4,6,2′-trimethoxy-6′-methylbenzophenone (R=F, R₁=CH₃, R₂=H); 2,4-dihydroxy-3-chloro - 5-fluoro-4,6,2′-trimethoxy-6′-methylbenzophenone (R=Cl, R₁=CH₃, R₂=F); 2,4′-dihydroxy-5-fluoro-4,6,2′-trimethoxy - 6′-methylbenzophenone (R=H, R₁=CH₃, R₂=F).

As stated previously, the benzophenones having the general Formula III are key intermediates for the preparation of griseofulvin and griseofulvin analogs which have valuable antifungal properties and which may in turn be used as intermediates in making other griseofulvin-related compounds. The conversion of the benzophenone derivatives to griseofulvin and its analogs is brought about by reacting the 2,4′-dihydroxy-3-R-4,6,2′-trimethoxy-5-R₂-6′-R₁-benzophenone with potassium ferricyanide in aqueous potassium carbonate in a nitrogen atmosphere. The product of this reaction is a 7-R-4,6,2′-trimethoxy-5-R₂-6′-R₁-gris-2′,5′-diene-3,4′-dione, Compound IV, where R, R₁ and R₂ are as defined above. The nomenclature and numbering system employed for naming these compounds, as well as those having the Formula V above, is that recommended by Grove et al., J. Chem. Soc. 3977 (1952). When R is chloro, R₂ is hydrogen and R₁ is methyl, the product obtained on the potassium ferricyanide oxidation is racemic dehydrogriseofulvin. As will be apparent to those skilled in this art, these substances, as well as those having structural Formula V, contain asymmetric carbon atoms and are produced synthetically as racemic mixtures of the possible stereoisomers. The racemic 7-R-4,6,2′-trimethoxy-5-R₂-6′-R₁-gris-2′,5′-diene-3,4-dione is converted to racemic 7-R-4,6,2′-trimethoxy-5-R₂-6′-R₁-gris-2′-ene-3, 4′dione by treatment with hydrogen in the presence of a palladium catalyst and in a non-alcohol solvent medium. One mole of hydrogen is absorbed and the predominant reaction product is that represented as Compound V above. Minor amounts of the benzophenone III or of the more highly saturated product may be produced as a result of a hydrogenolysis or over reduction which occurs as a secondary reaction to the catalytic hydrogenation. When R is chloro, R₂ is hydrogen and R₁ is methyl, the material produced in the hydrogenation reaction is racemic griseofulvin.

The following examples are given for the purpose of illustration and not by way of limitation:

EXAMPLE 1

(A) *2-chloro-3,5-dimethoxyphenyl 2-methyl-4-acetoxy-6-methoxybenzoate*

A solution of 800 mg. of 2-methyl-4-acetoxy-6-methoxybenzoic acid in 20 ml. of thionyl chloride is kept at 50° C. for 2 hours. The reaction mixture is concentrated to dryness under vacuum to give a residue of 2-methyl-4-acetoxy-6-methoxybenzoyl chloride. To this product is added 626 mg. of 2-chloro-3,5-dimethoxyphenol and 11 ml. of pyridine. The mixture is warmed on the steam bath for 2 minutes and then kept at 25° C. for 18 hours. Chloroform is then added and the mixture extracted with cold dilute hydrochloric acid, cold dilute sodium hydroxide solution and saturated sodium chloride solution. The chloroform solution is dried over magnesium sulfate, filtered and then concentrated to dryness under vacuum. Crystallization of the resulting residue from ether gives 880 mg. of 2-chloro-3,5-dimethoxyphenyl 2-methyl-4-acetoxy-6-methoxybenzoate, M.P. 152–155° C.

$\lambda_{max.}^{MeOH}$ 281 m$\mu$ ($\epsilon$, 4150); $\lambda_{max.}^{Chf.}$ 5.75, 5.80$\mu$ (B) *2-chloro-3,5-dimethoxyphenyl 2-methyl-4-hydroxy-6-methoxybenzoate*

A solution of 870 mg. of 2-chloro-3,5-dimethoxyphenyl 2-methyl-4-acetoxy-6-methoxybenzoate in 60 ml. of methanol and 40 ml. of aqueous 10% sodium hydroxide is kept at 25° C. for 4 hours. The methanol is then removed under vacuum and the reaction mixture is extracted with chloroform. The aqueous phase is acidified with dilute hydrochloric acid, extracted with chloroform and the chloroform extract washed with salt solution and dried over magnesium sulfate. It is filtered to remove the drying agent and concentrated to dryness under vacuum. The residue is crystallized to give 615 mg. of 2 - chloro - 3,5 - dimethoxyphenyl 2 - methyl-4-hydroxy-6-methoxybenzoate, M.P. 142–144° C.;

$\lambda_{max.}^{MeOH}$ 283 m$\mu$ ($\epsilon$, 5700), 261 m$\mu$ ($\epsilon$, 6800); $\lambda_{max.}^{Chf.}$ 2.76, 3.00, 5.74$\mu$.

EXAMPLE 2

*2,4'-dihydroxy-3-chloro-4,6,2'-trimethoxy-6'-methylbenzophenone*

A solution of 100 mg. of 2-chloro-3,5-dimethoxyphenyl 2-methyl-4-hydroxy-6-methoxybenzoate in 2.5 ml. of ethanol in a quartz tube is irradiated with ultra-violet light (Hanovia Type 16A13 broad spectrum low pressure light source) at 40° C. for 66 hours. The solvent is removed and the residue chromatographed on a column of 20 g. of Florisil. The column is eluted successively with benzene, benzene-chloroform, chloroform and chloroform-methanol mixtures. Crystallization of the residues obtained from the chloroform:5–10% methanol eluates from ethyl ether gives 2,4'-dihydroxy-3-chloro-4,6,2'-trimethoxy-6'-methylbenzophenone, M.P. 212.5–215° C.

EXAMPLE 3

*Dehydrogriseofulvin*

To a stirred solution of 2.25 g. of 2,4'-dihydroxy-4,6,2'-trimethoxy-6'-methyl-3-chloro-benzophenone and 27 g. of potassium carbonate in 250 ml. of boiled nitrogen-flushed distilled water is added a solution of 4.0 g. of potassium ferricyanide in 50 ml. of water. The addition is carried out in a nitrogen atmosphere over a period of 1 hour. The reaction mixture is stirred at room temperature under nitrogen for 18 hours. The precipitated material is recovered by filtration and air dried. It is dissolved in chloroform and the solution filtered. The chloroform is diluted with about an equal volume of ether and washed with ice-cold 2% potassium hydroxide solution and with water. The organic solvent solution is dried over magnesium sulfate, filtered and concentrated to dryness in vacuo. The residue is crystallized from acetone-ethyl acetate to afford substantially pure racemic dehydrogriseofulvin, M.P. 284–286° C.; $\lambda$max. 292 m$\mu$ ($\epsilon$, 32,000), infl. 230 m$\mu$ ($\epsilon$, 22,000), infl. 318 ($\epsilon$, 5,900). Further purification by passage through a Florisil column raises the melting point to 291–293° C.

EXAMPLE 4

*Griseofulvin*

500 mg. of racemic dehydrogriseofulvin in 110 ml. of ethyl acetate is added to a stirred suspension of 1.0 g. of pre-reduced 10% palladium on charcoal catalyst and hydrogenated at atmospheric pressure and 22° C. When 1.0 mole of hydrogen is absorbed (occurs rapidly) the catalyst is removed by filtration and the filtrate concentrated in vacuo to a viscous pale yellow oil. This oil is dissolved in 50 ml. of methylene chloride and the solution washed with 3 x 10 ml. of ice-cold 2% potassium hydroxide, water, and dried over magnesium sulfate. The methylene chloride solution is filtered and concentrated to dryness in vacuo. The solid residue thus obtained is dissolved in 15 ml. of benzene and chromatographed on a column of 15 g. of Florisil. The column is eluted with 15-ml. portions of benzene, benzene-chloroform mixtures and finally with chloroform. From the chloroform eluates two products are obtained, one with M.P. 213–215° C. (11.5% yield) and the second with M.P. 222–224° C. (51% yield). Characterization is by in vivo bio-assay by the disc-plate method with *Botrytis allii* as the test organism.

The material melting at 222–224° C. is racemic griseofulvin. It has 50% of the activity of natural griseofulvin.

EXAMPLE 5

*2-chloro-3,5-dimethoxyphenyl 4-hydroxy-6-methoxybenzoate*

(A) 1 g. of 4-acetoxy-2-methoxybenzoic acid is added to 20 g. of thionyl chloride and the resulting mixture held at 50° C. for 130 minutes. The reaction mixture is then concentrated to dryness to give a residue of 4-acetoxy-2-methoxybenzoyl chloride. This material is mixed with 15 ml. of pyridine and 720 mg. of 2-chloro-3,5-dimethoxyphenol. The reaction mixture is heated at about 90° C. for 2 minutes and then held at room temperature for 12 hours. Chloroform is then added to the solution and 2-chloro-3,5-dimethoxyphenyl 4-acetoxy-6-methoxybenzoate recovered and crystallized by the procedure described in Example 1(A).

The benzoate ester is treated with aqueous methanolic sodium hydroxide at room temperature by the process of Example 1B. There is thus obtained 2-chloro-3,5 - dimethoxyphenyl 4-hydroxy-6-methoxybenzoate, M.P. 147-150° C.;

$\lambda_{max.}^{Chf.}$ 3.05, 5.88$\mu$ (B) The acid chloride of 2-methyl-4-acetoxy-6-methoxybenzoic acid is prepared from the free acid as described in Examples 1A and 5A, and reacted with phloroglucinol dimethyl ether by the procedure of Example 1(A) to give 3,5-dimethoxyphenyl 2-methyl-4-acetoxy-6-methoxybenzoate. This ister is hydrolyzed to 3,5-dimethoxyphenyl 2-methyl-4-hydroxy-6 - methoxybenzoate with methanolic sodium hydroxide according to the procedures of Examples 1(B) and 5(A).

EXAMPLE 6

*2,4'-dihydroxy-3-chloro-4,6,2'-trimethoxybenzophenone*

(A) 200 mg. of 2-chloro-3,5-dimethoxyphenyl 4-hydroxy-6-methoxybenzoate in 5 ml. of ethanol in a quartz tube is irradiated with ultra-violet light (Hanovia Type 16A13 broad spectrum low pressure light source) at 40° C. for 58 hours. The resulting reaction mixture is treated by the recovery procedure of Example 2 to give 2,4'-dihydroxy-3-chloro-4,6,2'-trimethoxybenzophenone.

(B) When the above procedure is carried out using 3,5-dimethoxyphenyl 2-methyl-4-hydroxy-6 - methoxybenzoate as starting material, there is obtained 2,4'-dihydroxy-4,6,2'-trimethoxy-6' - methylbenzophenone, M.P. 180–182° C.

EXAMPLE 7

*7-chloro-4,6,2'-trimethoxy-gris-2',5'-diene-3,4'-dione*

(A) 2.2 g. of 2,4'-dihydroxy-3-chloro-4,6,2' - trimethoxybenzophenone is treated with 27 g. of potassium carbonate and 4 g. of potassium ferricyanide under nitrogen by the method of Example 3. There is obtained substantially pure racemic 7-chloro-4,6,2'-trimethoxy-gris-2',5'-diene-3,4'-dione.

(B) When the procedure of Example 3 is carried out employing 2,4'-dihydroxy-4,6,2'-trimethoxy-6'-methylbenzophenone as the starting material, there is obtained racemic 4,6,2'-trimethoxy-6'-methyl-gris-2',5'-diene - 3,4' - dione, M.P. 241–244° C.

EXAMPLE 8

*7-chloro-4,6,2'-trimethoxy-gris-2'-ene-3,4'-dione*

(A) When the product of Example 7(A) is treated with hydrogen in the presence of palladium on charcoal catalyst according to the procedure of Example 4, there is obtained from the chloroform eluates racemic 7-chloro-4,6,2'-trimethoxy-gris-2'-ene-3,4'-dione.

(B) When racemic 4,6,2'-trimethoxy-6'-methyl - gris-2',5'-diene-3,4' - dione is hydrogenated according to the procedure of Example 4, there is obtained racemic 4,6,2'-trimethoxy-6'-methyl-gris-2'-ene-3,4' - dione, M.P. 218–219° C.

EXAMPLE 9

*7-fluoro-4,6,2'-trimethoxy-6'-methyl-gris-2'-ene-3,4'-dione*

(A) 50 g. of the benzyl ether of 2-amino-3,5-dimethoxyphenol is added to 100 ml. of methanol and 3 g. of 5% palladium on charcoal. The solution is treated with hydrogen until about 1 mole of hydrogen is consumed. It is then filtered and concentrated to dryness in vacuo to give a residue of 2-amino-3,5-dimethoxyphenol.

20 g. of this phenol in 40 ml. of hydrochloric acid is mixed with 15 g. of sodium nitrite in 25 ml. of water. To the resulting solution is added 60 ml. of 40% fluoboric acid. A diazonium fluoborate salt precipitates and is recovered by filtration. It is washed with fluoboric acid and then successively with ethyl alcohol and ether. It is then dried in vacuo. On warming, the product decomposes to give 2-fluoro-3,5-dimethoxyphenol which may be purified by distillation in vacuo.

(B) 2-fluoro-3,5-dimethoxyphenyl 2-methyl-4-acetoxy-6-methoxybenzoate is obtained by reacting together the acid chloride of 2-methyl-4-acetoxy-6 - methoxybenzoic acid and 2-fluoro-3,5-dimethoxyphenol according to the procedure of Example 1A. This latter compound is hydrolyzed to 2-fluoro-3,5-dimethoxyphenyl 2-methyl-4-hydroxy-6-methoxybenzoate according to the method of Example 1(B).

When 2-fluoro-3,5-dimethoxyphenyl 2-methyl-4 - hydroxy-6-methoxybenzoate is irradiated with ultra-violet light according to the process described in Example 2, there is obtained 2,4'-dihydroxy-3-fluoro-4,6,2'-trimethoxy-6'-methylbenzophenone, M.P. 186–190° C.; 200–203° C. (double melting point).

To a solution of 700 mg. of 2,4'-dihydroxy-3-fluoro-4,6,2'-trimethoxy-6'-methylbenzophenone in 20 ml. of tertiary butanol there is added a solution of 12.3 g. of potassium carbonate in 88 ml. of water. The butanol is removed from the deep yellow solution by concentration in vacuo and 2.8 g. of potassium ferricyanide in 35 ml. of water is then added dropwise to the residual aqueous solution over a 5 minute period. A heavy cream colored precipitate forms. After stirring for 15 minutes at room temperature about 20 ml. of water is added and the resulting mixture extracted with 2 x 20 ml. of ethyl acetate. The organic extracts are combined, washed with cold dilute sodium hydroxide and sodium chloride solution, and dried over magnesium sulfate. The solution is then concentrated to dryness in vacuo and the residue thus obtained crystallizes from a mixture of acetone and ether to give substantially pure 7-fluoro-4,6,2'-trimethoxy-6'-methyl-gris-2',5'-diene-3,4' - dione, M.P. 222–225° C.

A solution of 465 mg. of the product obtained immediately above in 50 ml. of 1,2-dimethoxy ethane is added to a stirred suspension of 900 mg. of 10% palladium on charcoal catalyst in 25 ml. of 1,2-dimethoxy ethane in a hydrogen atmosphere. The reaction is allowed to proceed until 0.9 equivalents of hydrogen is absorbed. This requires about 5 minutes. The hydrogenation is then stopped, the catalyst removed by filtration and the solvent removed by concentration in vacuo. The residue thus obtained is dissolved in 20 ml. of acetic acid and stirred with 800 mg. of zinc dust for 10 minutes. The zinc is then removed by filtration, 15 ml. of water added and the mixture extracted with 2 x 20 ml. of chloroform. The chloroform extracts are washed with dilute sodium hydroxide solution, with sodium chloride solution, and then dried over magnesium sulfate. The solvent solution is finally concentrated to dryness to give a colorless residue. This residue is dissolved in a small volume of chloroform and chromatographed on a column containing 26 g. of activated alumina. Elution of the column with benzene-chloroform yields 7-fluoro-4,6,2'-trimethoxy-6'-methyl-gris-2'-ene-3,4'-dione which is purified from acetone-ether, M.P. 209–211° C.

EXAMPLE 10

*5-chloro-4,6,2'-trimethoxy-6'-methyl-gris-2',5'-diene-3,4'-dione*

When 2,4' - dihydroxy - 5 - chloro-4,6,2'-trimethoxy-6'-methylbenzophenone is treated with potassium ferricyanide in potassium carbonate by the procedure set forth for the fluoro compound in Example 9, there is obtained 5-chloro-4,6,2'-trimethoxy - 6' - methyl-gris-2',5'-diene-3,4'-dione, M.P. 204–207° C. Treatment of this latter material with hydrogen in the presence of a palladium catalyst as set forth in Example 9 yields 5-chloro-4,6,2'-trimethoxy-6'-methyl-gris-2'-ene-3,4'-dione, M.P. 213–214° C.

When 2,4'-dihydroxy-3,5-dichloro-4,6,2'-trimethoxy-6'-methylbenzophenone is treated with potassium ferricyanide and potassium carbonate by the method of Example 9, and the resulting 5,7-dichloro-4,6,2'-trimethoxy-6'-methyl-gris-2',5'-diene-3,4'-dione reacted with hydrogen in the presence of palladium, also by the method of Example 9, there is produced 5,7-dichloro-4,6,2'-trimethoxy-6'-methyl-gris-2'-ene-3,4'-dione (5-chloro griseofulvin).

EXAMPLE 11

The fluorophenols of Formula I above (where at least one of R and $R_2$ is fluoro) may be obtained as described below.

(A) *2-fluoro-3,5-dimethoxyphenol; 4-fluoro-3,5-dimethoxyphenol*

A solution of 50 g. of phloroglucinol dimethyl ether in 400 ml. of pyridine is flushed with nitrogen by passing a stream of nitrogen through the solution for 5 minutes. The solution is then chilled to about 5° C. and perchloryl fluoride bubbled slowly through the solution. The mixture is allowed to warm to 25° C. and the slow addition of perchloryl fluoride (about one bubble per second) continued for 28 hours. The reaction mixture is then flushed with nitrogen and concentrated in vacuo to a syrup. 200 ml. of water is added to the syrup followed by sufficient cold 2.5 N hydrochloric acid to make the mixture acidic. The resulting yellow precipitate is recovered by filtration, washed with water and air dried. It consists essentially of a 1:1 mixture of $\Delta^{2,4}$-6,6-difluoro-3,5-dimethoxy-cyclohexadiene-1-one and $\Delta^{2,5}$ - 4,4 - difluoro - 3,5 - dimethoxy-cyclohexadiene-1-one, M.P. 80–115° C. These cyclohexadiene-ones are separated and obtained substantially pure by fractional crystallization from ether and finally from an acetone-ether mixture. The $\Delta^{2,5}$-cyclohexadiene-one is less soluble than the $\Delta^{2,4}$-cyclohexadieneone. After purification by crystallization from ether and acetone-ether $\Delta^{2,4}$-6,6-difluoro - 3,5 - dimethoxy-cyclohexadiene-1-one has M.P. 105–107° C., and $\Delta^{2,5}$-4,4-difluoro-3,5-dimethoxy-cyclohexadiene-1-one has M.P. 146–48° C.

29 g. of the 1:1 mixture of cyclohexadieneones obtained as described in the preceding paragraph is added to 150 ml. of acetic acid. The solution is chilled to 10° C. and 30 g. of zinc dust added to it. The resulting mixture is stirred vigorously for 1 hour at 10–15° C. and then filtered. The solids are washed with 30 ml. of ether and 30 ml. of water, and the washings added to the filtrate. The filtrate is extracted with 3 x 100 ml. of ether. The ether extracts are combined, washed with cold dilute sodium hydroxide solution and dried over magnesium sulfate. The drying agent is then removed by filtration and the ether solution concentrated to dryness in vacuo to give 26 g. of a red oil. This oil is steam distilled and the distillate (about 15 liters) treated with sodium chloride and extracted with 3 x 5 liters of ether. The ether extracts are combined and concentrated to dryness to give about 12 g. of a pale yellow oil. This oil is crystallized from ether-petroleum ether to give substantially pure 2-fluoro-3,5-dimethoxyphenol, M.P. 68–70° C. The non-volatile residue from the steam distillation crystallizes slowly upon standing in the cold to give substantially pure 4-fluoro-3,5-dimethoxyphenol, M.P. 70–73° C.

(B) *2-fluoro-3,5-dimethoxyphenol; 2-chloro-4-fluoro-3,5-dimethoxyphenol*

60 g. of 2-chloro-3,5-dimethoxyphenol in 500 ml. of pyridine is treated with perchloryl fluoride as described in Example 7(A). The solid obtained upon completion of the reaction, removal of the pyridine, and acidification of an aqueous solution of the pyridine residue (the isolation procedure of Example 7(A) consists of a mixture of $\Delta^{2,4}$-6-chloro-6-fluoro-3,5-dimethoxy-cyclohexadiene-1-one and $\Delta^{2,5}$-4,4-difluoro-6-chloro-3,5-dimethoxy-cyclohexadiene-1-one. These products are separated by fractional crystallization from ether and acetone-ether as described in Example 7(A) to give $\Delta^{2,4}$-6-chloro-6-fluoro-3,5-dimethoxy-cyclohexadiene-1-one, M.P. 100–102° C., and $\Delta^{2,5}$-4,4-difluoro-6-chloro-3,5-dimethoxy-cyclohexadiene-1-one, M.P. 197–99° C. The $\Delta^{2,4}$-6-chloro-6-fluorodieneone is the less soluble of the two products. Treatment of the pure cyclohexadieneones with zinc dust as described in the second paragraph of Example 7(A) and extraction of the reaction mixture with ether (as described above) affords an oil on removal of the ether in vacuo. This oil is triturated with ether to give crystalline 2-fluoro-3,5-dimethoxyphenol and 2-chloro-4-fluoro-3,5-dimethoxyphenol, respectively.

(C) *2-fluoro-4-chloro-3,5-dimethoxyphenol; 4-fluoro-3,5-dimethoxyphenol*

When 4-chloro-3,5-dimethoxyphenol is treated with perchloryl fluoride as described in Part B above, there is obtained a mixture of $\Delta^{2,4}$-4-chloro-6,6-difluoro-3,5-dimethoxy-cyclohexadiene-1-one and $\Delta^{2,5}$-4-chloro-4-fluoro-3,5-dimethoxy-cyclohexadiene-1-one. Separation of this mixture by fractional crystallization and treatment of the separated products with zinc as described above yields 2-fluoro-4-chloro-3,5-dimethoxyphenol and 4-fluoro-3,5-dimethoxyphenol.

Any departure from the above description which conforms to the present invention is intended to be included within the scope of the claims.

What is claimed is:
1. The process for preparing a benzophenone compound of the formula

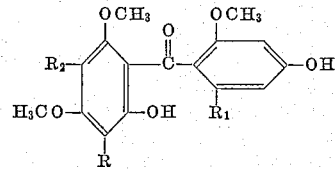

where R and $R_2$ are selected from the class consisting of fluorine, chlorine and hydrogen, wherein at least one of R and $R_2$ is hydrogen, and $R_1$ is selected from the class consisting of hydrogen and lower alkyl that comprises exposing a compound of the formula

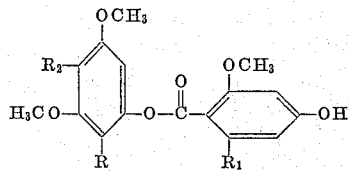

where R, $R_1$ and $R_2$ are as defined above, to ultra-violet light for a period of less than about 72 hours.

2. The process for preparing 2,4'-dihydroxy-3-chloro-4,6,2'-trimethoxy-6'-methylbenzophenone that comprises exposing 2-chloro - 3,5 - dimethoxyphenyl 2-methyl-4-hydroxy-6-methoxybenzoate to ultra-violet light for a period of from about 24 to about 72 hours.

3. The process for preparing 2,4'-dihydroxy-3-fluoro-4,6,2'-trimethoxy-6'-methylbenzophenone that comprises exposing 2 - fluoro - 3,5 - dimethoxyphenyl 2-methyl-4-hydroxy-6-methoxybenzoate to ultra-violet light for a period of from about 24 to about 72 hours.

4. The process for preparing 2,4'-dihydroxy-3-chloro-4,6,2'-trimethoxybenzophenone that comprises exposing 2-chloro-3,5-dimethoxyphenyl 4 - hydroxy-6-methoxybenzoate to ultra-violet light for a period of from about 24 to about 72 hours.

References Cited by the Examiner

UNITED STATES PATENTS

| | | | |
|---|---|---|---|
| 2,759,966 | 8/56 | Beman | 260—473 |
| 2,773,903 | 12/56 | Hardy et al. | 260—591 |
| 2,789,140 | 4/57 | Von Glahn et al. | 260—591 |
| 2,910,454 | 10/59 | Clark et al. | 260—473 |
| 3,012,063 | 12/61 | Roller | 260—473 |

OTHER REFERENCES

Scott: Proc. Chem. Soc. (London), 1958, p. 195.

LORRAINE A. WEINBERGER, *Primary Examiner.*

DURAL McCUTCHEN, LEON ZITVER, *Examiners.*